United States Patent [19]

Savin

[11] Patent Number: 4,891,394

[45] Date of Patent: Jan. 2, 1990

[54] COATING COMPOSITION CONTAINING METALLIC PIGMENTS EXHIBITING EXCELLENT RESISTANCE TO ENVIRONMENTAL ATTACK

[76] Inventor: Ronald R. Savin, 10448 Chester Rd., Cincinnati, Ohio 45215

[21] Appl. No.: 182,529

[22] Filed: Apr. 18, 1988

Related U.S. Application Data

[63] Continuation-in-part of Ser. No. 73,981, Jul. 16, 1987, abandoned.

[30] Foreign Application Priority Data

Jul. 30, 1986 [FR] France ................ 86 11238

[51] Int. Cl.$^4$ ............ C08K 3/08; C08K 3/36
[52] U.S. Cl. .................... 523/442; 523/443; 523/459; 524/356; 524/379; 524/391; 524/439; 524/492; 524/493
[58] Field of Search ............ 523/442, 443, 459; 524/439, 492, 356, 379, 391

[56] References Cited

U.S. PATENT DOCUMENTS

| | | | |
|---|---|---|---|
| 3,954,693 | 5/1976 | Fong | 523/458 |
| 3,998,771 | 12/1976 | Feneis, Jr. et al. | 523/442 |
| 4,417,007 | 11/1983 | Salensky et al. | 523/459 |
| 4,748,194 | 5/1987 | Geeck | 523/459 |

FOREIGN PATENT DOCUMENTS 2602239 2/1988 France .

OTHER PUBLICATIONS

T. K. Jones, "Performance of Zinc Dust in an Epoxy Polyamide Coating," (date unknown) Mattheisen & Hegeler Zinc Co.

*Primary Examiner*—Wilbert J. Briggs, Sr.
*Assistant Examiner*—David W. Woodward
*Attorney, Agent, or Firm*—Frost & Jacobs

[57] ABSTRACT

A coating composition for the protection of metallic and non-metallic substrates against corrosion, comprising a film-forming polymer; at least one particulate metallic pigment in an amount ranging from about 30% to about 60% by weight based on the total weight of the composition; an agent for control of electrical conductive characteristics having an oil absorption value of less than 20 (determined by ASTM standard D 281-84), the volumetric ratio of the control agent to the metallic pigment ranging from 0.7:1 to 1.25:1; an agent for control of rheological characteristics; and at least one solvent compatible with the polymer.

17 Claims, No Drawings

COATING COMPOSITION CONTAINING METALLIC PIGMENTS EXHIBITING EXCELLENT RESISTANCE TO ENVIRONMENTAL ATTACK

CROSS-REFERENCE TO RELATED APPLICATION

This application is a continuation-in-part of Ser. No. 07/073981, filed July 16, 1987, now abandoned, in the name of Ronald R. Savin.

FIELD OF THE INVENTION

The present invention relates to coating compositions containing particulate metallic pigments used for the protection of metallic and non-metallic substrates, providing improved resistance to environmental attack, particularly to corrosion, and exhibiting a longer useful life. More particularly, the invention provides a zinc-rich composition which can be used efficiently in moving line production and can be applied with all conventional types of equipment including airless and electrostatic spray, dip, flowcoat and rollercoating without difficulty.

BACKGROUND OF THE INVENTION

It is well known to apply a coating, called a ground coat or primer coat, to metallic or non-metallic substrates which are sensitive to corrosion or to premature aging, in order to protect them against environmental factors. Examples of substrates requiring protection include, for example, hulls, interior and superstructures of ships, off-shore oil drilling platforms, metallic frames, bridges, automobile bodies and related equipment, storage tanks, guardrails, and aircraft equipment.

All these substrates, when insufficiently protected, undergo chemical transformation actions, initially superficial and then more in depth, reducing their physical and particularly their mechanical characteristics, when they are exposed to severe natural or synthetic environmental conditions, such as heat, cold, ultraviolet radiation, moisture, particularly saline, wind, rain, sea water, snow, particle impacts and other harmful factors due to atmospheric pollution or to liquid or gaseous fluids resulting from the chemical, biochemical, biological and other industries.

Heretofore, depending on the substrate and its environment, there have been used as protective coatings various compositions prepared in aqueous medium or in organic solvents containing polymers as diverse as, for example, phenolic resins, chlorinated rubbers, polyesters, polyurethanes, epoxy resins, also containing reactive pigments such as zinc, lead, barium, calcium and strontium chromates, and zinc phosphates, or metallic oxides such as iron, titanium and zinc oxides, and also containing zinc in fine particulate form.

More particularly, the prior art describes and recommends anti-corrosive coatings containing reactive pigments based on epoxy, phenoxy, and/or vinyl chloride resins, in aqueous medium or organic solvents, for the protection of metallic substrates, making use of the reactivity of the epoxy or phenoxy groups with curing agents such as aliphatic or aromatic polyamines, aliphatic or aromatic polyamides, melamine, polyisocyanates, or urea-formaldehyde resin, thus resulting in homogeneous systems by an addition reaction.

Serious toxological problems arising from utilization of the various chromium salts of zinc, lead, barium, calcium and cobalt have greatly reduced the use thereof in paint formulations. Industrial and governmental restrictions at all levels further limit the use of these effective corrosion resistant pigments, thus rendering it more difficult to formulate effective corrosion resistant coatings.

Since development in the late 1930's zinc-rich primers have been considered optimum anti-corrosion coatings on iron or steel substrates. However, numerous problems have restricted their use generally to maintenance type rather than industrial type primers. This limitation is due to the nature of the anti-corrosion reaction of the zinc dust. As explained in *Schering Industrial Chemicals: Surface Preparation* I, page 29:

"Zinc powder in rust inhibiting paints has a different mode of action than the usual rust inhibiting pigments. The action is based on an electrochemical interaction between the zinc powder and the steel substrate it is meant to protect. In order not to insulate the various pigment particles from each other it is therefore necessary to work with very little binder. A satisfactory corrosion protection is only achieved when the pigment:binder ratio is at least 92:8 (optimum 95:5). The maximum recommended film thickness is about 50 um."

This high zinc to binder ratio required to provide effective cathodic protection has been accepted by the entire coating industry.

The high zinc level and the relatively high density of zinc powder often cause undesirable settling during short term storage. Hence, the zinc powder is often added just prior to application and mixed rapidly during application to prevent settling and clogging of spray equipment. This is a deterrent to efficient field use.

Single component soft settling zinc dust formulations do not utilize binders with low water vapor transmission properties, thereby greatly reducing the optimum qualities which could be provided by coreacted hydrophobic systems such as epoxy, phenoxy and vinyl polymers.

A somewhat lower zinc content is disclosed in U.S. Pat. No. 3,998,771, issued December, 1976 to T. J. Feneis, Jr. et al, which describes water-based coating compositions for application on iron supports to obtain anticorrosive coatings which include in a single phase composition:

(a) about 2% to 10% by weight of a non-volatile, liquid epoxy resin, with low viscosity, derived from bisphenol A and an epihalohydrin, for example, epichlorohydrin;

(b) about 2% to 10% by weight of a modified polyamide, i.e., an addition product of a water soluble polyamide and a liquid epoxy resin; and (c) about 55 to 70% by weight of a zinc-powder pigment having an average particle size of about 2–15 microns.

U.S. Pat. No. 4,417,007, issued November 1983 to G. A. Salensky et al, discloses a one phase composition containing from about 4% to 25% by weight epoxy or phenoxy resin binder and polyamine hardener, about 43% to 90% by weight zinc dust, about 3% to 38% by weight $Mn_3O_4$ fume pigment, up to 35% by weight additional pigments including pigment extenders and fillers (such as talc, clays, diatomaceous silica and silica), up to 5% by weight pigment suspension agent (such as hydrous magnesium silicate and lecithin), and balance organic solvents. A 1:1 volume ratio of zinc dust:$Mn_3O_4$ is preferred.

However, although these epoxy resin-based coatings for metallic or non-metallic substrates have very appreciably improved the useful life of the substrates, it has been found that the best coatings proposed by the prior art still exhibit major disadvantages which are manifested, for example, by blisters, separation from the substrate to be protected, evidence of poor adhesion and/or of premature corrosion, thus requiring frequent restoration of the protective coating.

Anti-corrosive coating compositions of the type having a very high zinc content are described in the book *ZINC DUST AND POWDER: THEIR PRODUCTION, PROPERTIES AND APPLICATIONS*, C. Bradford, Hafford et al, First Edition, May 1982, published by International Lead Zinc Research Organization, Inc., 292 Madison Avenue, N.Y. 10017 pages 90–91. Such anti-corrosive coating compositions with very high contents of zinc powder have the reputation of permitting production of protective films equivalent to an anodic metallic coating. In order to accomplish this, these compositions contain from about 80 to 95% by weight, based on the total weight, of zinc powder, less than 1.8% by weight of a pigment suspension agent (pyrogenous silica) and accordingly, a very low content of binder, i.e. of film-forming polymers. This low binder content is considered an advantage by those skilled in the art, since an excess would, in the dried coating, isolate the metallic grains from each other and also from the substrate to be protected. It is considered that contact of the metallic grains with the substrate must be perfect, according to Volume II: *Peinteures et Vernis* (Paints and Varnishes) by P. Grandou and P. Pastour—1982 Edition, published by Hermann, Paris, page 39.

*Performance of Zinc Dust in an Epoxy Polyamide Coating*, by T. K. Jones, published by Matthiessen & Hegler Zinc Co. (publication date unknown) summarizes tests performed on coatings containing from about 70% to 95% by weight powdered zinc in an epoxy resin-polyamide binder. The binder system was the conventional two-component type wherein part A contained zinc dust, epoxy resin, polyamide resin, minor amounts of bentonite, urea-formaldehyde resin and silica gel, and solvents; and part B contained a polyamide hardening agent and solvents. Optimum results were obtained with 0% to 95% zinc dust.

However, the use of a high concentration of metallic pigments results in disadvantages in addition to those described above, which are exhibited during the preparation, storage and/or application of the anti-corrosion coating compositions.

One disadvantage results from the high reactivity of the metallic pigments with respect to certain substances present in the anti-corrosive coating compositions. This reactivity results in a significant development of the rheological characteristics of the compositions, for example a rapid and troublesome increase in viscosity with time and the appearance of a gel or even caking of the compositions before application.

A further disadvantage lies in the fact that it is extremely difficult to have available an anti-corrosive coating composition which simultaneously has a high concentration of reactive metallic pigments and sufficient binder to permit easy handling or optimum surface adhesion. These two requirements are diametrically opposed to each other with the result that it is difficult to deposit compositions with a high concentration of metallic pigments on the substrate to be protected, and therefore protective coatings with only 5% to 10% binder are produced with poor adhesion characteristics. Blasting or other pretreatment of the metal substrate is thus necessary in order to secure adequate adhesion.

Additionally, the surface of an anti-corrosive coating with a very high zinc content, after application to the substrate to be protected, remains relatively rough and even irregular in appearance and therefore does not permit the deposition of a sufficiently aesthetic top coat for many industrial applications, such as the bodies of automobiles, trucks, buses and other industrial equipment which require a very smooth and glossy surface for exposed parts.

Another disadvantage also arises from the fact that the substrate to be protected, particularly if of iron or steel, must undergo preparatory surface treatment by at least one mechanical process (such as sanding, brushing, shot blasting, hammering or burn-off), and/or a chemical process (such as descaling with an acid or pickling treatment).

Finally, another disadvantage resides in the fact that prior art organic anti-corrosive coating compositions have a capacity for protecting metallic substrates against corrosion which is limited in performance with depositions of $\pm 3$ mils (75 microns) to an average of 1500 hours in salt spray by the ASTM B117 standard. It is highly desirable to improve this performance especially for metal substrates exposed to particularly aggressive media.

It is an object of the present invention to provide improved low cost coating compositions for the protection of metallic or non-metallic substrates which avoid or reduce the disadvantages of prior art compositions outlined above.

A further object of the invention is the provision of a zinc-based coating composition which can be easily applied over untreated metal substrates and used in all conventional application equipment while at the same time meeting all current governmental environmental regulations regarding solvent emissions for volatile organic compounds (VOC).

A still further object is to provide an anti-corrosive coating composition which exhibits an improved capability for deposition on a substrate to be protected; which provides improved adhesion between the coating and substrate; which is flexible, resistant to chemical agents and mechanical and thermal shocks; which exhibits an excellent dimensional stability and low hardening shrinkage; and which provides improved protection life as compared with the best anti-corrosive coatings currently available.

SUMMARY OF THE INVENTION

The above and other objects and advantages are provided in accordance with the present invention in a coating composition for the protection of metallic and non-metallic substrates against corrosion, comprising a film-forming polymer; at least one particulate metallic pigment in an amount ranging from about 30% to about 60% by weight based on the total weight of said composition; an agent for control of electrical conductive characteristics having an oil absorption value of less than 20 measured by ASTM standard test D281-84, the volumetric ratio of said agent to said metallic pigment ranging from about 0.7:1 to about 1.25:1; an agent for control of rheological characteristics; and at least one solvent compatible with the polymer.

The agent for control of conductive characteristics (to insure particle-to-particle electrical contact of the metallic pigment to the substrate and hence galvanic electrochemical effect) is a crystalline silica having an oil absorption value of less than 20. Crystalline silica of this type has been found to permit intimate contact of the metallic particles with the metal substrate. The type of silica and volumetric ratio thereof to metallic pigment is critical.

Coating compositions in accordance with the invention may be either a single phase or a two phase type, and may contain an aqueous medium as a solvent, or an organic solvent comprising ketones, alcohols, aromatic compounds, and mixtures thereof.

Polymers which may be used include: epoxy resins (having an epoxide value of 250 to 2500) crosslinked with polyamides, polyamines, amines, melamines and/or urea-formaldehyde; and vinyl resins copolymerized with polyisocyanates or melamines.

DETAILED DESCRIPTION OF THE INVENTION

In order to develop an effective zinc primer system which could be applied over untreated metal with conventional application equipment, such as spray, dip, flow and rollercoat, it was found to be necessary to reduce the level of zinc dust from the conventional 75% to 95% by weight to a maximum of 60%, and preferably 40% to 50% by weight, based on the total weight of the composition. Only at this lower level is it possible to utilize sufficient binder, extender and additives to obtain a product with excellent application, soft settling and storage properties.

The difficulties encountered in development of the present invention were classic to the coating industry and consistent with the belief that higher binder levels resulted in unacceptable cathodic protection by, in effect, encapsulating the zinc particles so that they were not free to make intimate contact with the metal substrate. As the level of binder and extender pigment was increased and the zinc level decreased in experimental formulations, corrosion resistance decreased dramatically. More specifically, at a level of 70% by weight zinc in an epoxy system crosslinked with polyamide, polyamine and/or melamine, rust was extensive over smooth and abraded steel substrates when exposed to 5% NaCl, 100% relative humidity at 500 hours, despite the use of low water vapor transmission hydrophobic binder systems.

After many unsuccessful tests of extender pigments such as talcs, calcium carbonate, clays, diatomaceous earth and the like, it was found that crystalline silica with an oil absorption value of less than 20 (ASTM test D 281-84) and preferably present in a volume approximately equal to that of the zinc powder provided outstanding corrosion resistance. Although not intending to be bound by theory, it is believed that silica of this type in the specified amount is uniquely successful due to layering or packing of the silica particles which permits intimate particle-to-particle contact of the zinc dust and contact with the metal substrate. These results are consistent whether applied over untreated cold rolled steel, abraded steel surfaces or chemically treated steel (zinc or iron phosphate).

The ASTM D 281-84 standard test method for oil absorption of pigments by spatula rub-out (published December 1984) is as follows:

1 g (or any multiple thereof) of thoroughly mixed and ar dried pigment is placed on an smooth glass plate or marble slab. Raw linseed oil (conforming to Specification D 234 except having an acid number of 3±1) is added gradually, drop by drop (by means of a dropping bottle fitted with ground-in pipet and rubber bulb, or buret graduated in 0.1 ml divisions) to the pigment. After the addition of each drop, the oil is thoroughly incorporated by rubbing up with a sharp-edged steel spatula. The end point is reached when exactly enough oil has been incorporated with the pigment to produce a very stiff, putty-like paste which does not break or separate. Oil absorption value is reported as the number of pounds (grams) of oil required to exactly wet 100 pounds (grams) of pigment.

The polymer content ranges from about 10% to about 25% by weight of the total composition. Polymers which can be used in the compositions of the invention include the following:

Epoxy polymers preferably containing at least one epoxy function per molecule with the formula

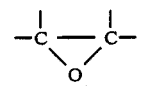

Examples include the reaction product of an epihalohydrin, e.g., epichlorohydrin and a polyol such as glycerol, a polyphenol, or a bis-hydroxyphenyl alkane, e.g. bisphenol-A. An epoxide value (epoxy equivalent) of about 250 to about 2500 is preferred.

Vinyl polymers such as vinyl chloride coreacted with blocked or unblocked polyisocyanates, or melamines, preferably with an average molecular weight between about 5,000 and 25,000.

Suitable commercially available epoxy polymers include Araldites sold by Ciba-Geigy, Epophens sold by Borden Chemical, Epikotes sold by Shell Chemicals Ltd., D.E.R. sold by Dow Chemical Company, MOD-EPOX sold by Monsanto Corporation and other equivalents.

Suitable vinyl copolymers include UCAR (VAGD, VYES, VAGH, VROH) sold by Union Carbide and LAROFLEX MP 35 sold by BASF.

Cross linking agents or hardeners for epoxy polymers include at least one compound with an —NH₂, —CONH₂, —NHR, —CONHR and/or —COOH functional group, which react by way of these functional groups with the expoxy polymer, as is well known. Preferably aliphatic or aromatic polyamides are used as hardening agents, although aliphatic polyamines, aromatic polyamines, melamine, or urea-formaldehyde resin may be used for epoxy resin, and melamines or polyisocyanates may be used for vinyl chloride resin. The weight ratio of epoxy polymer to hardening agent preferably ranges from about 3:1 to about 1:1. The hardener may range from about 1% to about 25% by weight of the total composition in a one phase system, and from 2% to about 30% in a two phase system.

Suitable commercially available polyamides of the above type include Versamid and Euredur sold by Schering, Synolide sold by Cray Valley, Sylvamid, and equivalents.

It is within the scope of the invention to utilize both an epoxy resin and a vinyl copolymer in admixture.

Polyvinyl chloride copolymers exhibit excellent resistance to water, hardness, flexibility and good adhesion to a metallic substrate. Vinyl chloride cured with polyisocyanates can be applied in the field at temperatures below 0° C., consequently permitting use in maintenance areas where application would otherwise be limited by the elements The reactions of hardening agents with epoxy and vinyl chloride resins are well known. The $-NH_2$ or $-NHR$ groups of the hardening agent react by an addition reaction with the terminal epoxy groups in accordance with the following reactions:

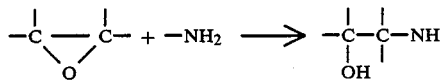

or

If the hardening agent contains $-COOH$ groups, the reaction proceeds by an esterification reaction with the hydroxyl side groups of the epoxy polymer in accordance with the following reaction:

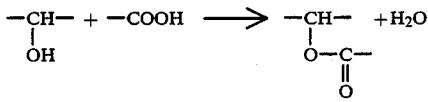

At least one particulate metallic pigment is present within the range of about 30% to about 60% by weight of the total weight of the composition, preferably about 40% to 50%, the metallic pigment being at least one of zinc and aluminum. Zinc is the preferred metal, and particulate zinc having an average particle size of about 2 to 15 microns is preferred, more preferably about 5 microns.

The silica used to control conductivity in the present invention is selected from natural crystalline silicas having an oil absorption value of less than 20 measured by ASTM standard test D 281-84, as indicated above. Excellent results have been obtained with Novacite, sold by Malvern Minerals Company, having an oil absorption value of less than 20. The amount of crystalline silica is varied directly with the amount of particulate metal in order to maintain a volume ratio of about 0.7:1 to about 1.25:1, and preferably about 1:1. Within the range of about 30% to about 60% by weight zinc, the range of silica is from about 10% to about 25% by weight based on the total weight of the composition. In a two component system the crystalline silica may be present in both components.

Pyrogenic amorphous silica is used in the present invention, with an average particle size less than 0.012 micron, in an amount ranging from about 1% to about 4% by weight, as an agent for control of rheological characteristics (to insure a good dispersion of the metallic pigment and crystalline silica and maintenance thereof in suspension). Pyrogenic silicas of this type are produced from specific treatments such as high temperature hydrolysis of silicon tetrachloride or from transformation of silica in an electric arc. Suitable pyrogenic silicas include those marketed under the trademarks Aerosil 300, Aerosil 972, Aerosil 974 and Aerosil 976 by Degussa, and Cabosil by Cabot Corporation. Aerosil silicas are amorphous, with spherical particles having an average diameter as low as about 0.007 micron.

A preferred coating composition according to the invention comprises, in weight percent based on the total weight of the composition:

from about 10% to about 25% of at least one film-forming polymer;
from about 30% to about 60% of at least one particulate metallic pigment;
from about 10% to about 25% of an agent for control of electrical conductive characteristics having an oil absorption value than 20;
from about 2%, to about 3% of an agent for control of rheological characteristics;
from about 5%, to about 25% of a crosslinking agent for the polymer; and
not more than 25% solvents A two component coating composition in accordance with the invention comprises, in weight percent based on the total weight of the composition (after admixture):

from about 2% to about 20% of at least one film-forming polymer containing at least one epoxy group per molecule;
from 0% to about 20% of at least one film-forming vinyl polymer;
from about 35% to about 55% of at least one reactive metallic pigment;
from about 10% to about 25% of at least one agent for control of electrical conductive and rheological characteristics of the composition;
from about 2% to about 30% of at least one hardening agent for the film-forming epoxy polymer; and
from about 10% to about 25% solvents.

A more preferred composition embodying the invention comprises, in weight percent based on the total weight of the composition:

from about 10% to about 20% of a film-forming polymer selected from the group consisting of an epoxy polymer, a vinyl chloride copolymer, and mixtures thereof;
from about 40% to about 50% particulate metallic zinc;
from about 10% to about 20% crystalline silica having an oil absorption value of less than 20;
from about 2% to about 3% of an agent for control of rheological characteristics;
from 2% to about 15% of a hardener for the polymer; and
from about 10% to 25% solvents.

It is preferred, although not essential, to introduce a surfactant which acts as a wetting agent to enhance intimate contact between the solid particles and the polymers and solvents. Suitable agents of this type include nonionic, fluorinated surfactants, such as fluoroalkyl esters. Suitable products include FC 430 and FC 431 sold by 3M Company.

A conventional catalyst may also be added to accelerate the reaction between the polymer and the cross linking agent. For an epoxy resin, the catalyst may be an organometallic compound, an amine and/or a polyamine, in an amount of from about 0.1% to about 5% by weight of the epoxy.

A coupling agent such as a silane or organo silicon compound may also be added to aid adhesion of the coating to the substrate.

When such optional ingredients as a catalyst, surfactant, and coupling agent are added, these will be present in conventional amounts well known to those skilled in the art.

It is also within the scope of the invention to include at least one corrosion-inhibiting metallic salt or metallic oxide such as chromates of zinc, strontium and cobalt, and similar conventional compounds in amounts permitted by government regulations.

Organic solvents which may be used include polar solvents which will keep the epoxy polymer in solution, as well as the vinyl copolymer (if included) and the hardening agent for the epoxy polymer. Examples of preferred solvents include ketones such as acetone, methylethylketone, methylpropylketone, methylisobutylketone, methylamylketone and cyclohexanone; alcohols such as butanol and isopropanol, and aromatic solvents such as toluene and xylene.

Any one or more of the preferred or more preferred ranges indicated above can be used with any one or more of the broad ranges for the remaining components set forth above.

The amount of volatile organic compounds (VOC) present as solvents in protective coatings is a matter of concern, and current federal and state regulations limit the amount of solvent between 250 and 420 grams per liter. It is an advantage of the composition of this invention that the volatile organic compound content does not exceed 25% by weight of the total weight of the composition.

Application of coatings of the present composition by conventional equipment makes it possible to obtain dried coating layers with a thickness ranging between about 10 and about 250 microns without the appearance of runs or shearing of the metallic pigment.

The invention provides a low cost zinc-based primer which meets virtually all environmental regulations and which offers greatly improved corrosion resistance to equipment and structures as diverse as bridges, electrical transformers, ships, trucks and automobiles. All compositions in accordance with the invention can be applied over treated, untreated and abraded metal.

After application all compositions are recoatable within 30 minutes and indefinitely thereafter without subsequent loss of adhesion. The flexibility of coatings produced by the compositions of the invention permits application over roller coated steel strip or sheet, which may then be stored and later formed into automotive, electrical and other parts (e.g., automobile and truck body parts and panels) for manufacturing operations which are to be topcoated for aesthetic appearance.

The following specific examples are given to illustrate further the various uses of the anti-corrosive coating compositions of the present invention. They are included here for illustrative purposes only and are not to be construed as limitations on the invention herein claimed.

EXAMPLE 1

The two phases (A) and (B) of an anti-corrosive coating composition according to the present invention were prepared by separately mixing the substances set forth in phases (A) and (B) respectively, wherein the quantities are expressed in percent by weight based on the total weight after admixture.

Phase (A): Film-forming polymers and pigments

| | |
|---|---|
| Shell 1001 F epoxy polymer | 9.02% |
| Union Carbide UCAR VAGD vinyl chloride polymer and/or copolymer | 3.76% |
| Agent for control of the rheological characteristics: Degussa AEROSIL 200 | 1.50% |
| 3M Company surfactant FC430 | 0.27% |
| Chromogenic pigment, chromium oxide | 3.00% |
| Metallic pigment, zinc powder | 42.13% |
| Silicone coupling agent | 0.24% |
| Solvents: | |
| Mixture or methylethylketone, methylpropylketone, and methylamylketone | 6.67% |

Phase (B): Hardening Agent

| | |
|---|---|
| Henkel 115 × 75 polyamide polymeric hardening agent | 5.12% |
| Agent for control of the electrical conductive characteristics: silica (NOVACITE from Malvern Minerals Company) | 16.55% |
| Agent for control of rheological characteristics - Degussa AEROSIL 300 | 2.03% |
| Solvents: | |
| Butanol | 1.02% |
| Xylene | 14.10% |

The two phases were then admixed at the rate of 100 parts by weight of phase (A) to 100 parts by weight of phase (B). The mixture was very fluid. The back sides of test coupons were then coated. After a drying time of 20 minutes at ambient temperature, the coating was hardened for 168 hours. The coating was then tested according to ASTM standards. Using the foregoing procedure, six groups of seven coupons were prepared using a substrate of cold-rolled steel.

The first group was simply degreased by means of trichlorethane. The second group was sandblasted. The third group was degreased and then underwent a phosphate treatment. Finally, the fourth group was left in its original state.

The following tests were carried out in accordance with U.S. Federal Standard 141a:

In a first test, the resistance of the coated coupons to salt spray was determined (salt spray test) by exposing them, coated with the above-mentioned composition, to a salt fog for 2500 hours with an aqueous solution containing NaCl in an amount of 5% by weight, maintained at a temperature of 41° C. A subsequent examination of the coated coupons did not show any blistering or the start of corrosion. This test was continued for a total of 2500 hours, with the examination of the coupons continuing to show absence of blistering and start of corrosion only at the scribe of the panels, a rating of 10 by ASTM B-117 test.

In a second test (test of adhesion in the humid state and test of adhesion by application of a tape), the coated coupons were immersed for 24 hours in distilled water. After drying, parallel scratches were traced on the coating by means of a stylus. By applying an adhesive tape, and then pulling off this tape, the coatings were found to be very strongly adherent to the substrate and free of blisters or separation.

In a third test, the coated coupons were immersed at ambient temperature for 30 days in hydraulic fluid. The coated coupons did not show any softening, decrease in thickness, or loss of adhesion.

In a fourth test, the coated coupons were subjected to a flexibility test, which consisted of first conditioning the coupons at a temperature of 23° C. and a relative humidity of 50% and then placing them on a cylindrical steel mandrel, 3 millimeters in diameter (with the coated side facing up). After several folds on the mandrel, the coatings did not show any fissure.

In a fifth test, the coated coupons were subjected to an impact test by means of a heavy steel cylinder dropped from a 40 inch height producing an impact of 320 lbs/inch$^2$. No fissure, rupture, or deterioration of the coating could be observed at the point of impact and after testing for removal with 3M Company tape.

Thus, the coating compositions according to the present invention provide very strong adhesion and an absence of corrosion under conditions of high humidity, attack by NaCl vapor, bending and impact.

EXAMPLE 2

The two phases (A) and (B) of another anti-corrosive coating composition according to the invention were prepared by separated mixing the substances set forth in phases (A) and (B) respectively, wherein the quantities are expressed in precent by weight with respect to the total weight.

Phase (A): Film-forming polymers and pigments

| | |
|---|---|
| Shell 1001 F epoxy polymer | 6.63% |
| Union Carbide UCAR VYES vinyl polymer and/or copolymer | 2.95% |
| Agent for the control of the rheological characteristics (Degussa AEROSIL 300 and 974) | 0.74% |
| 3M Company FC430 surfactant | 0.06% |
| Anti-foaming agent BYK 052 from BYK Chemie | 0.15% |
| TiO$_2$ pigment | 0.15% |
| Chromogenic pigment, zinc chromate | 5.90% |
| Metallic pigment, zinc powder | 44.25% |
| Solvents: | |
| mixture of methylethylketone and methylamylketone | 6.63% |

Phase (B): Hardening Agent

| | |
|---|---|
| Polyamide hardening agent SYLVAMIDE 200 | 4.72% |
| Agent for control of conductive characteristics, SiO$_2$ (NOVACITE) from Malvern Minerals Company | 15.23% |
| Agent for control of rheological characteristics Degussa AEROSIL 300 | 1.92% |
| 3M Company FC430 surfactant | 0.06% |
| Solvents: | |
| Mixture of xylene and butanol | 10.46% |

The two phases were admixed at the rate of 100 parts by weight of phase (A) to 100 parts by weight of phase (B). Coupons were prepared as described in Example 1 using the foregoing coating composition. All of the tests described in Example 1 were carried out on steel test coupons.

The coatings produced employing the foregoing anti-corrosion coating composition according to Example 2 exhibit strong adhesion and an absence of corrosion under conditions of high humidity, attack by salts, bending, and impact.

EXAMPLE 3

A two component composition was prepared by separately mixing the materials set forth under phase A and phase B respectively, with the quantities being expressed in percent by weight based on the total weight of the composition.

Phase A

| | |
|---|---|
| Epoxy polymer - 37-140 | 9.82% |
| Zinc dust #64 | 44.63% |
| Agent for control of conductive characteristics - Malvern NOVACITE 1250 | 4.46% |
| Agent for control of rheological characteristics - Degussa AEROSIL 974 | 0.89% |
| Sufactant - 3 M Co. FC430 | 0.06% |
| Solvents: | |
| Mixture of methylisobutylketone, methylamylketone and xylene | 6.58% |

Phase B

| | |
|---|---|
| Polyamide hardening agent SYLVAMID 300 | 8.03% |
| Agent for control of conductive characteristics - Malvern NOVACITE 1250 | 16.36% |
| Agent for control of rheological characteristics - Degussa AEROSIL 300 | 1.19% |
| Solvents: | |
| butanol | 5.83% |
| Xylene | 2.15% |
| Volume ratio NOVACITE: zinc dust = 1.23:1 | |

EXAMPLE 4

A one component composition which is baked after deposition (300° F.–350° F. for about 15–20 minutes, or at 800° F. for about 30–60 seconds) is as follows:

Single Component

| | |
|---|---|
| Epoxy polymer - Shell 1001 F | 11.20% |
| Zinc dust #64 | 44.18% |
| Agent for control of conductive characteristics - Malvern NOVACITE 1250 | 14.73% |
| Agent for control of rheological characteristics - Degussa AEROSIL 974 | 0.59% |
| - Degussa AEROSIL 300 | 1.18% |
| Melamine hardening agent CYMEL 303 | 8.26% |
| Surfactant 3M Co. FC 430 | 0.05% |
| Antifoaming agent - BYK 052 | 0.14% |
| Catalyst - acid catalyst BYK 451 | 0.47% |
| Solvents: | |
| Mixture of methylisobutylketone, methylamylketone, butanol and EXXON 600 | 19.20% |
| Volume ratio NOVACITE: zinc dust = 0.9:1 | |

EXAMPLE 5

A two component composition with a polyvinylchloride-polyisocyanate binder was prepared by separately mixing the materials set forth under phase A and phase B respectively, with the quantities being expressed in percent by weight based on the total weight of the composition.

Phase (A)

| | |
|---|---|
| Polyvinyl chloride - Un. Carbide VYES-4 | 13.06% |
| Zinc dust #64 | 52.25% |
| Agent for control of conductive characteristics - Malvern NOVACITE 1250 | 13.06% |
| Agent for control of rheological characteristics - Degussa AEROSIL 380 | 1.04% |
| Solvents: | |
| Mixture of methylethylketone, methylamylketone and methylpropylketone | 16.51% |

Phase (B)

| | |
|---|---|
| Polyisocyanate hardening agent - Desmodur N-75 | 2.32% |
| Solvent: | |
| methylamylketone | 1.76% |
| Volume ratio NOVACITE: zinc dust = 0.7:1 | |

EXAMPLE 6

A one-component composition with a polyvinyl chloride-melamine binder which is baked after deposition at about 275° F. for 10 minutes is as follows:

Single Component

| | |
|---|---|
| Polyvinyl chloride - Un. Carbide VYES-4 | 15.96 |
| Melamine hardening agent - 1133 | 0.96 |
| Zinc dust #64 | 44.70% |
| Agent for control of conductive characteristics - Malvern NOVACITE | 12.77% |
| Agent for control of rheological characteristics - Degussa AEROSIL 380 | 1.28% |
| - Degussa AEROSIL 972 | 0.64% |
| Solvents: | |
| Mixture of methylethylketone and EXXON 600 | 23.69% |
| Volume ratio NOVACITE: zinc dust = 0.75:1 | |

Coatings of 2.5 to 5 mils dried thickness of the compositions of Examples 3, 4, 5 and 6 were deposited on untreated cold rolled steel substrates. Properties of these coatings are set forth in Table I. It is to be noted that all coatings met or exceeded the Federal Standards for solvent emissions.

TABLE I

Properties - U.S. Federal Standard 141a
Deposited on steel substrate - single coat -
2.5 to 5 mils thickness

| | Example 3 | Example 4 | Example 5 | Example 6 |
|---|---|---|---|---|
| Drying | Air-168 hrs. or 150°-195° F. for 1 hr. | 300°-350° F.- 20 min. | Air-10 min. or 135°-175° F. | 250° F.-275° F. 20. min. |
| Salt Spray | >2500 hrs. | 3000 hrs. | >1500 hrs. | >1500 hrs. |
| Adhesion | | | | |
| 24 hr. H₂O | excellent | excellent | excellent | excellent |
| Tape | excellent | excellent | excellent | excellent |
| Hydraulic fluid | 30 days no effect | 30 days no effect | 30 days no effect | 30 days no effect |
| Impact | >160 in lb | >160 in lb | >160 in lb | >160 in lb |
| Flexibility | | | | |
| 23° C. 50% R.H. | excellent | excellent | excellent | excellent |
| 23° C. | excellent | excellent | excellent | excellent |

I claim:

1. A coating composition for the protection of metallic and non-metallic substrates against environment attack, comprising a film-forming polymer selected from the group consisting of epoxy resins having an epoxide value of about 250 to 2500, vinyl chloride resins copolymerized with polyisocyanates, vinyl chloride resins copolymerized with melamines, and mixtures thereof; particulate metallic zinc in amount ranging from about 30% to about 60% by weight based on the total weight of said composition; an agent for control of electrical conductive characteristics comprising a crystalline silica having an oil absorption value of less than 20 measured by ASTM standard test D281-84, the volumetric ratio of said agent to said metallic zinc ranging from about 0.7:1 to about 1.25:1; an agent for control of rheological characteristics; and at least one solvent compatible with said polymer.

2. The composition of claim 1, wherein said polymer ranges from about 10% to about 25% by weight of the total weight of said composition.

3. The composition of claim 2, including a crosslinking agent for said polymer in an amount ranging from about 1% to about 25% by weight of the total weight of said composition.

4. The composition of claim 1 wherein said metallic zinc has an average particle size of about 2 to 15 microns.

5. The composition of claim 1, wherein said agent for control of rheological characteristics is a pyrogenic amorphous silica having an average particle size less than about 0.012 micron, said agent being present in an amount ranging from about 2% to about 3% by weight of the total weight of said composition.

6. The composition of claim 2, wherein said solvents are selected from the group consisting of ketones, alcohols, aromatic organic compounds, and mixtures thereof, in an amount not greater than 25% by weight of the total weight of said composition.

7. A coating composition for the protection of metallic and non-metallic substrates against environmental attack comprising, in weight percent based on the total weight of the composition:
 from about 10% to about 20% of at least one film-forming polymer selected from the group consisting of epoxy resins having an epoxide value of about 250 to 2500, vinyl chloride resins copolymerized with polyisocyanates, vinyl chloride resins copolymerized with melamines, and mixtures thereof;
 from about 30% to about 60% of particulate metallic zinc;

from about 10% to about 25% of an agent for control of electrical conductive characteristics comprising a crystalline silica having an oil absorption value of less than 20 measured by ASTM standard test D281-84;

from about 2% to about 3% of an agent for control of rheological characteristics;

from 5% to about 25% of a crosslinking agent for said polymer; and not more than 25% solvents.

8. The composition of claim 7, wherein said metallic zinc has an average particle size of about 2 to 15 microns.

9. The composition of claim 7, wherein the volumetric ratio of said crystalline silica to said metallic zinc ranges from about 0.7:1 to 1.25:1.

10. The composition of claim 7, wherein said agent for control of rheological characteristics is a pyrogenic amorphous silica having an average particle size ranging from about 0.007 to less than about 0.012 micron.

11. The composition of claim 7, wherein said solvents are selected from the group consisting of ketones, alcohols, aromatic organic compounds, and mixtures thereof, in an amount ranging from about 10% to not more than 25%.

12. The composition of claim 7, wherein said metallic zinc has an average particle size of about 2 to 15 microns in an amount ranging from about 40% to about 50%, and wherein said crystalline silica is present in a volumetric ratio to said zinc of about 1:1.

13. The composition of claim 12, wherein said polymer is an epoxy resin, and wherein said crosslinking agent is a hardener selected from the group consisting of aliphatic polyamides, aromatic polyamides, aliphatic polyamines, aromatic polyamides, melamine, urea-formaldehyde, and mixtures thereof.

14. The composition of claim 13, wherein said solvents are selected from the group consisting of ketones, alcohols, aromatic organic compounds, and mixtures thereof, in an amount ranging from about 10% to not more than 25%.

15. A coating composition for the protection of metallic and non-metallic substrates against environmental attack, comprising in weight percent based on the total weight of the composition:

from about 10% to about 20% of a film-forming polymer selected from the group consisting of an epoxy polymer, a vinyl chloride copolymer, and mixtures thereof;

from about 40% to about 50% particulate metallic zinc;

from about 10% to about 20% crystalline silica having an oil absorption value of less than 20 measured by ASTM standard D281-84;

from about 2% to about 3% of an agent for control of rheological characteristics;

from about 2% to about 15% of a hardener for said polymer; and from about 10% to 25% solvents.

16. A two component coating composition for the protection of metallic and non-metallic substrates against environmental attack, comprising, in weight percent based on the total weight of said composition after admixture:

from about 2% to about 20% of at least one film-forming polymer containing at least one epoxy group per molecule;

from 0% to 20% of at least one film-forming vinyl polymer;

from about 35% to about 55% of particulate metallic zinc;

from about 10% to about 25% of at least one agent for control of conductive and rheological characteristics of said composition, said agent for control of conductive characteristics comprising a crystalline silica having an oil absorption value of less than 20 measured by ASTM standard test D281-84;

from about 2% to about 30% of at least one hardening agent for said film-forming epoxy polymer; and from about 10% to about 25% solvents.

17. The composition of claim 16, including a catalyst to accelerate reaction between said epoxy polymer and said hardening agent in an amount ranging from about 0.% to about 5% by weight of said epoxy polymer, a surfactant, and a coupling agent.

* * * * *